(12) United States Patent
Hiizumi et al.

(10) Patent No.: US 6,821,473 B2
(45) Date of Patent: Nov. 23, 2004

(54) METHOD AND APPARATUS FOR FORMING THREE-DIMENSIONAL LAMINATED PRODUCT FROM PHOTO-CURABLE LIQUID

(76) Inventors: Koki Hiizumi, c/o Meiko Co., Ltd. 732 Shimoimai, Futaba-cho, Kitakoma-gun, Yamanashi (JP); Shigeru HagiHara, c/o Yamanashi Prefectural Government, 1-6-4 Marunoucui, Kofu-shi, Yamanashi (JP)

( * ) Notice: Subject to any disclaimer, the term of this patent is extended or adjusted under 35 U.S.C. 154(b) by 260 days.

(21) Appl. No.: 10/060,604

(22) Filed: Jan. 30, 2002

(65) Prior Publication Data

US 2002/0084038 A1 Jul. 4, 2002

Related U.S. Application Data

(63) Continuation of application No. 09/449,082, filed on Nov. 24, 1999, now abandoned.

(30) Foreign Application Priority Data

Nov. 19, 1999 (JP) ............................................ 11-367703

(51) Int. Cl.⁷ ......................... B29C 35/08; B29C 41/02; B29C 71/00
(52) U.S. Cl. ....................... 264/401; 264/233; 264/494; 425/174.4; 425/375
(58) Field of Search ................................. 264/233, 401, 264/494; 425/174.4, 375

(56) References Cited

U.S. PATENT DOCUMENTS

| 5,238,614 A | 8/1993 | Uchinono et al. |
| 5,258,146 A | 11/1993 | Almquist et al. |
| 5,432,045 A | 7/1995 | Narukawa et al. |
| 5,534,104 A | 7/1996 | Langer et al. |
| 5,902,537 A | * 5/1999 | Almquist et al. ........... 264/401 |

FOREIGN PATENT DOCUMENTS

| EP | 0 450 762 A1 | 10/1991 |
| EP | 0 492 953 A1 | 7/1992 |
| EP | 0 597 114 A1 | 5/1994 |

OTHER PUBLICATIONS

Search report for European Application No. 00125133 (completed Apr. 2, 2001).*

* cited by examiner

Primary Examiner—Leo B. Tentoni
(74) Attorney, Agent, or Firm—Martin Fleit; Paul D. Bianco; Fleit Kain Gibbons Gutman Bongini & Bianco, P.L.

(57) ABSTRACT

A three-dimensional laminated product forming apparatus and method for forming a three-dimensional laminated product from a photo-curable liquid by progressively superposing solid laminae one on top of another by photo-curing a surface layer of the photo-curable liquid and converting it to a solid lamina. A product table is provided on which a three-dimensional solid product is built up in progressive steps and which is incrementally advanced into the photo-curable liquid by a specified depth each step. A liquid surface leveling device works as a capillary to draw up a photo-curable liquid by capillary action while it is in contact with the surface of the photo-curable liquid contained in the container. The device is moved over the surface of the photo-curable liquid to apply the collected photo-curable liquid over a three-dimensional laminated product being partly built up on a product table to form a uniform thickness of a surface layer of the photo-curable liquid with a surface leveled and smoothed over the three-dimensional laminated product being partly built up. An irradiating head forms a beam spot of reactive stimulation on the surface to cure the surface layer and convert it to a solid lamina on the three-dimensional laminated product being partly built up as the three-dimensional laminated product.

11 Claims, 6 Drawing Sheets

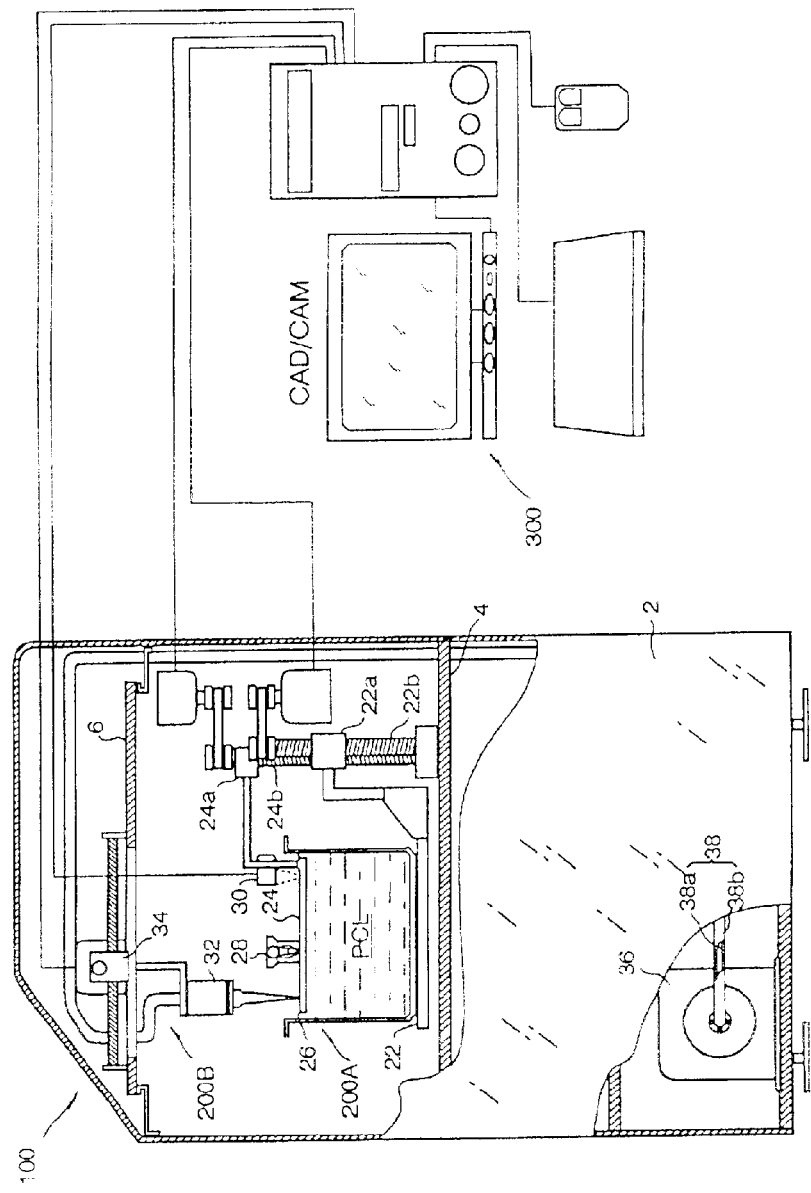

METHOD AND APPARATUS FOR FORMING THREE-DIMENSIONAL LAMINATED PRODUCT FROM PHOTO-CURABLE LIQUID

RELATED APPLICATION

This application is a continuation of application Ser. No. 09/449,082 filed Nov. 24, 1999.

BACKGROUND OF THE INVENTION

1. Field of the Invention

The present invention relates to a method and an apparatus for forming a three-dimensional laminated product, such as, a model or core useful for investment casting of an intended ornamental jewelry craft product.

2. Description of the Related Art

In recent years, it has been known to form a three-dimensional product by successively superposing a number of photo-cured laminae of stratified cross sections of the three-dimensional product one on the top of another. Specifically, a photo-cured lamina is formed on previously photo-cured laminae by scanning and curing a specified thickness of surface layer of a photo-curable liquid by laser energy, building up the three-dimensional product. One of such methods and apparatus for forming three-dimensional products from a photo-curable liquid is known from, for instance, Japanese Unexamined Patent Publication No. 56-144478.

In order to introduce a fresh liquid of a quantity necessary to provide a specified thickness of surface layer of the photo-curable liquid, which will to be formed as a photo-cured lamina on the previously superposed photo-cured laminae, the under-building product needs to be moved precisely by a distance equal to the specified thickness in progress steps away from the working surface level of the photo-curable liquid at which a surface layer of the fresh liquid is irradiated with laser energy. In practice this has proven difficult. For example, for forming the surface layer of the photo-curable liquid with a precisely controlled thickness, as described in, for instance, European Patent Specifications EP 0171069B1 and EP 0535720B1, the under-building product is initially moved down away from the specified working surface to a level beyond the specified working surface level, and then, moved back to the specified working surface level in order to accomplish each stepwise adjustment during the process of making the article being built. Alternatively, as described in, for instance, Japanese patents Nos. 26195445 and 2715649, a fresh liquid spray mechanism is provided to spray a fresh liquid so as to form a precise thickness of surface layer of a photo-curable liquid on an under-building product after moving down the under-building product away from the specified working surface by a distance equal to the specified thickness.

While employing an initial increment of movement of the last formed lamina away from the specified working surface to a level beyond the specified working surface level enables the apparatus for building a three-dimensional product by photo-curing to be simple in construction and mechanism and compact in overall size, however, it causes a somewhat tangled problem of spending a long time before completely building a three-dimensional product. That is, the photo-curable liquid is governed in fluidity by its relatively high viscosity and surface tension, and therefore, a relatively long time is required to introduce a precisely controlled quantity of the fresh liquid for providing a specified thickness of surface layer of the photo-curable liquid for the next processing step. In addition to a long time that is spent before introduction of a precisely controlled quantity of the fresh liquid, a time is required to move back the working surface to the specified working surface level after the introduction of a precisely controlled quantity of the fresh liquid. Further, application of laser energy onto a surface layer of the photo-curable liquid must wait for a time until the surface layer is entirely leveled. In consequence, a long working time is necessary to complete a single photo-cured lamina, which causes a rise in manufacturing costs. Since the photo-curable liquid transforms from a fluid to a solid by means of photo-chemical reaction, such as, a radical reaction and a cationic reaction, the photo-curable liquid itself has a somewhat restricted effective life, which causes a large quantity of photo-curable liquid of no direct use, and hence leads to a rise in manufacturing costs.

On the other hand, while spraying a fresh liquid by means of the fresh liquid spray mechanism to form a precise thickness of surface layer of a photo-curable liquid on an under-building product reduces a time required to introduce a precisely controlled quantity of the fresh liquid and level a surface layer, and realizes miniaturization of a fluid container in which the photo-curable liquid is accommodated, the fresh liquid spray mechanism has to be equipped not only with various associated parts such as a nozzle, mesh screen, a rotary shaft, a brush and a water wheel which makes the apparatus bulky, but also a secondary fluid container in which a photo-curable liquid to be sprayed must be provided. Further, there is the necessity of installing a surface level adjusting mechanism for adjusting a level of the surface layer after spraying a fresh liquid. Such a surface level adjusting mechanism is complicated in structure and expensive, which leads to a rise in manufacturing costs.

SUMMARY OF THE INVENTION

It is a primary object of the invention to provide a method an apparatus for forming a three-dimensional laminated product from a photo-curable liquid by step-wise photo-curing of laminae.

Another object of the invention is to provide a three-dimensional laminated product forming apparatus equipped with a liquid surface leveling device working as a capillary which draws up a reserve of photo-curable liquid therein and applies it over a laminated product that is being built up so as to form a uniform thickness of a surface layer of the photo-curable liquid with a working surface leveled and smoothed.

The foregoing objects are accomplished by providing a three-dimensional laminated product forming method and apparatus for forming a three-dimensional laminated product from a photo-curable liquid by progressively superposing solid laminae having a specified thickness, one on top of another, each solid lamina being provided by photo-curing a surface layer of the photo-curable liquid and converting it to a solid lamina. The three-dimensional laminated product forming apparatus comprises a product table on which a three-dimensional solid product is built up in progressive steps, said product table being sunken in a reservoir of photo-curable liquid by a distance equal to the specified thickness of the solid lamina in each said step; and a liquid surface leveling device which works with a capillary effect to collect or draw up a reserve of photo-curable liquid while it is in contact with the surface of the photo-curable liquid contained in a container which is placed on a container table.

The leveling device is moved over the surface of the photo-curable liquid to apply the collected photo-curable liquid over a three-dimensional laminated product, that has been partly built up on a product table and stepped down for the next lamina, so as to form a uniform thickness of a surface layer of the photo-curable liquid with a surface leveled and smoothed over the three-dimensional laminated product that has been partly built up. An irradiating head forms a beam spot of reactive stimulation (ultraviolet energy) on the smoothed and leveled surface layer of the photo-curable liquid so as thereby to cure the surface layer, and convert it to a solid lamina superposing on the three-dimensional laminated product that is partly built up as the three-dimensional laminated product.

According to the three-dimensional solid product forming apparatus and method, it is enabled to form a specified thickness of a surface layer of a photo-curable liquid over a three-dimensional product having been partly building up. The surface layer leveling device comprises a pair of surface leveling blades having an entrance that is set for a predetermined opening so that it is arranged as to work as a capillary. The structure is simple and the driving mechanism for it is also simple and inexpensive. As a result, the three-dimensional solid product forming apparatus is made small in overall size, operates quickly and is provided at low cost.

BRIEF DESCRIPTION OF THE DRAWINGS

The foregoing and other objects and features of the invention will be made clear when reading the following description in accordance with a preferred embodiment thereof in conjunction with the accompanying drawings in which:

FIG. 1 is a side view partly broken away of a three-dimensional laminated product forming apparatus in accordance with a preferred embodiment of the invention;

DETAILED DESCRIPTION OF THE PREFERRED EMBODIMENT

Figure 2A:
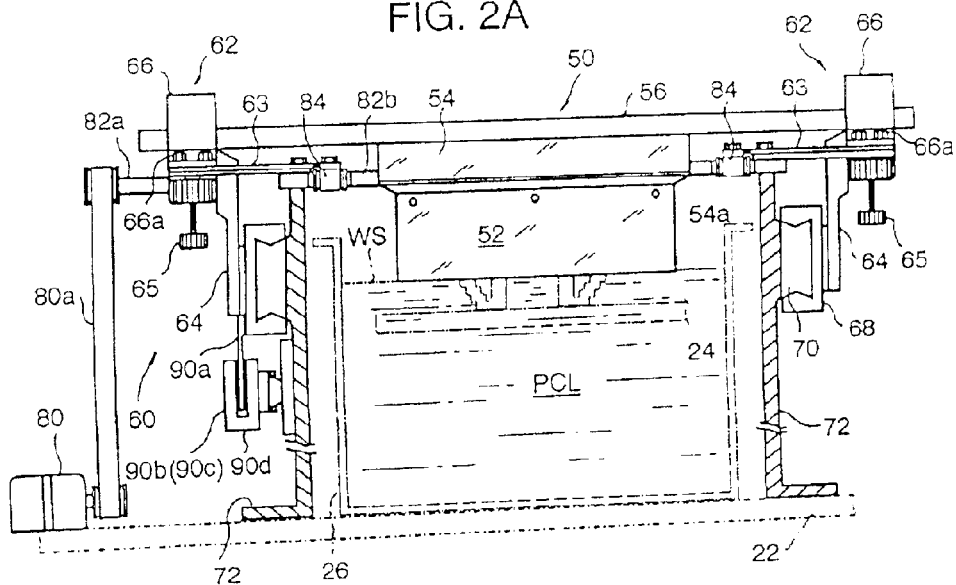
FIG. 2A is a front view of a liquid surface layer leveling unit that is installed in the three-dimensional laminated product forming apparatus shown in FIG. 1.

Referring to the drawings in detail, in particular, to FIG. 1 which shows a computer controlled laminate molding apparatus 100 specialized for forming a three-dimensional laminated product, such as, a prototype of jewelry rings, from a photo-curable liquid by photo-curing. The computer controlled laminate molding apparatus 100 has a housing 2 provided with a stationary bottom platform 4 on which a laminated three-dimensional product building unit 200A is installed, and a stationary top platform 6 to which a photo-curing unit 200B is installed, both platforms being fixedly mounted to the housing 2. The laminated product building unit 200A includes a movable container table 22 on which a container 26 filled with a photo-curable liquid PCL, such as, a photo-curable resin, is placed, a movable product table 24 on which a three-dimensional laminated product is built up from the photo-curable liquid PCL in the container 26, and a liquid surface layer leveling unit 28 which is detachably mounted on the movable container table 22. The movable container table 22 is guided on a guide post 22b fixedly supported on the stationary platform 4 and moved up and down in a vertical direction by a vertical position control mechanism 22a to adjust a vertical position of the container 26, and hence, in particular, a vertical position of the top surface of the photo-curable liquid PCL in the container 26, when required. The movable product table 24 is guided on guide post 24b and moved down by a vertical position shift mechanism 24a so as to shift a working surface of the top photo-cured laminae in vertical position. The term "working surface" used herein shall mean and refer to the surface of liquid at which a spot of reactive stimulation is focused on the photo-curable liquid to cure the photo-curable liquid and convert it to a solid material. The working surface is adjusted incrementally at a specified level by shifting down the movable product table 24 in steps by a vertical distance of preferably from approximately 30 to approximately 70 microns, that is, substantially equal to a predetermined thickness of surface layer of the photo-curable liquid is to be cured and converted to a solid lamina over a solid body consisting of photo-cured laminae that form part of a desired final three-dimensional laminated product. The liquid surface layer leveling unit 28, which will be described in detail later in connection with FIG. 2, develops and forms precisely the specified thickness of surface layer of the photo-curable liquid over the solid body consisting of photo-cured laminae that form part of the desired three-dimensional laminated product that is being built up from the photo-curable liquid PCL.

The photo-curable resin employed as the photo-curable liquid PCL in the preferred embodiment of the invention has a composition such that it can be cured by ultraviolet energy of less than 400 nm wave length. Many such compositions are known to those skilled in the art, and the composition may consist, for example, of acrylate resins and/or epoxy resins. For purposes of the present invention, the photo-curable liquid PCL needs to have a specific gravity of about 1.2, a viscosity of about 1.4 Pa·S and a molecular weight of from about 200 to about 700. The composition may also include a hardener and/or a photo-curing initiator, as are known, and is of generally low viscosity and a relatively high shrinkage rate.

The photo-curing unit 200B includes a beam irradiation focussing head 32 for applying a spot of reactive stimulation, such as, an He—Cd laser having a wavelength of 320 nm, to the photo-curable liquid PCL at a specified working surface, an X-Y position control mechanism such as an X-Y digital plotter 34 that moves the beam irradiation head 32 in two horizontal directions intersecting each other, and a laser light source 36. In the preferred embodiment, a multiple mode type of laser is used that has a wavelength of 325 nm and generates 5 to 10 mW output. In the case where a three-dimensional laminated product has a minute shape, it is preferable to employ a single mode type of laser having 3 to 10 mW output which is easily focused since it does not encounter waveform disorder. Laser rays generated by the light source 36 are transmitted to the beam irradiation head 32 by way of light guide means 38 and focused as a beam spot on the photo-curable photo medium PCL at the working surface. In order to transmit the laser rays with a high efficiency, and in a high level of safety, the light guide device employs a step-index type of optical fiber 38a and a flexible metal tube 38b in which the optical fiber 38a is protected. Because the step index type of optical fiber has apprehensions of causing waveform disorder due to repeated internal refraction of laser rays in the optical fiber and causing diffusion of laser rays after an exit end of the optical fiber, in the case of a minutely shaped three-dimensional laminated product, a single step index type of optical fiber, or otherwise a grated index type of optical fiber, may be preferably employed. In order to apply photo-curing laser energy generated by the laser source 36 onto a surface layer of the photo-curable liquid PCL, the light source 36 is provided with a plurality of high speed mechanical shutters (not shown) which are controlled in operation by actuators so as to admit laser energy to enter the optical fiber and shut off it from entering the optical fiber. In order to provide a laser beam of sufficient strength for curing a surface layer of the photo-curing liquid, the beam irradiation head 32 is provided with a focusing lens (not shown) operative to form a specified diameter of laser beam spot on the surface layer of the photo-curable liquid. The laser beam spot has a diameter of approximately 80 microns and a radiation strength of approximately 200 W/cm$^2$ at the working surface which is sufficient to cure a predetermined thickness of surface layer of the photo-curable liquid PCL. The working surface level is monitored by means or surface level sensor 30. Accordingly, the working surface level the working surface of the photo-curable liquid PCL is adjusted at a specified level with respect to the beam irradiation head 32 by moving up or down the movable container table 22.

Figure 2B:
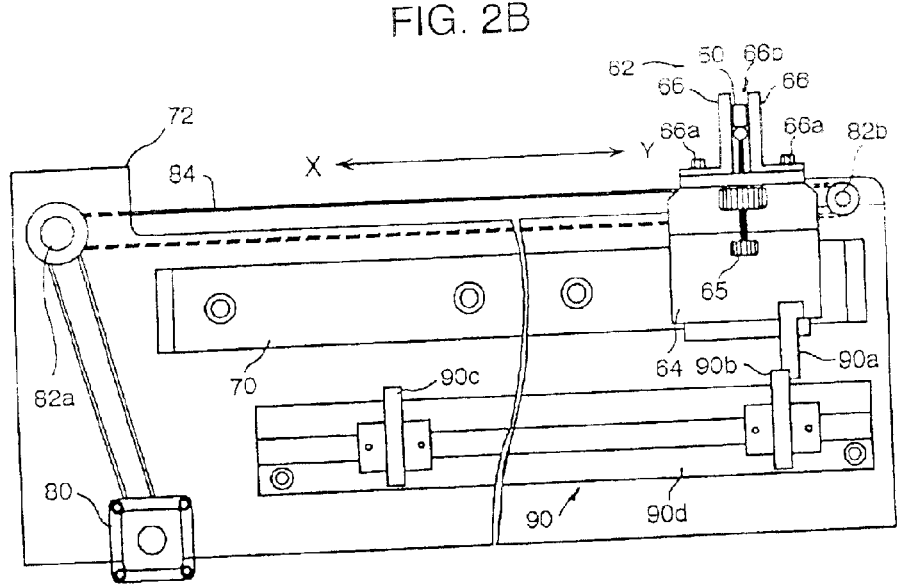
FIG. 2B is a side view of the liquid surface layer leveling unit that is installed in the three-dimensional laminated product forming apparatus shown in FIG. 1.

Referring to FIGS. 2A and 2B, the surface layer leveling unit 28 includes a liquid surface leveling device 50 that is driven in a direction X or the reverse direction Y by means of a drive mechanism 60 to level the surface layer of the photo-curable liquid PCL, as will be described in detail later. The liquid surface leveling device 50 comprises a pair of leveling blades 52 and an attachment 54 to which the leveling blades 52 are detachably secured at opposite sides by set screws 54a. The attachment 54 is an integral part of a blade mount beam 56. The drive mechanism 60 includes a pair of movable blade supports 62 on which the blade mount beam 56 is supported. Each blade support 62 comprises a base block 64 to which a pair of L-shaped support members 66 are secured by set screws 66a so as to form a space 66b therebetween for receiving the blade mount beam 56. The blade support 62 is provided with a blade adjustment screw 65 for adjusting a vertical level of the leveling blades 52 with respect to the working surface of the photo-curable liquid PCL. The base block 64 at its lower portion is provided with a guide slider 68 which slides on a guide rail 70 secured to an upright side wall 72 detachably secured to the container table 22. The blade support 62 is integrally formed with an arm 63 extending inwardly from the base block 64. The drive mechanism 60 further includes a reversible motor 80 secured to the container table 22. As shown in FIG. 2B, the upright side walls 72 at their opposite end portions support a drive shaft 82a and an idle shaft 82b. The motor 80 is connected to the drive shaft 82a by a belt 80a to transmit rotation of the motor 80 to the drive shaft 82a. Two timing belt 84 are mounted between the drive shaft 82a and the idle shaft 82b with appropriate tension. The arms 63 of the blade supports 62 are secured to the timing belts 84, respectively. When the motor 80 is actuated to rotate in an counterclockwise direction as viewed in FIG. 2B, the blade supports 62 with the liquid surface leveling device 50 supported thereby are moved in a direction X along the guide rail 70. On the other hand, when the motor 80 is reversed to rotate in a clockwise direction as viewed in FIG. 2B, the blade supports 62 with the liquid surface leveling device 50 supported thereby are moved back in a reverse direction Y along the guide rail 70.

The drive mechanism 60 further includes position limiting means 90 comprising a leg member 90a secured to the base block 64 of the blade support 62, a stationary limit sensor 90b secured to a guide rail 90d that is installed to the upright side wall 72, and a movable limit sensor 90c mounted on the guide rail 90d for slide movement. Each of the limit sensors 90b and 90c is operative to stop the motor 80 when detecting the leg member 90a. By sliding the movable limit sensor 90c, the extent of movement of the surface layer leveling unit 28 is regulated.

Figure 3:
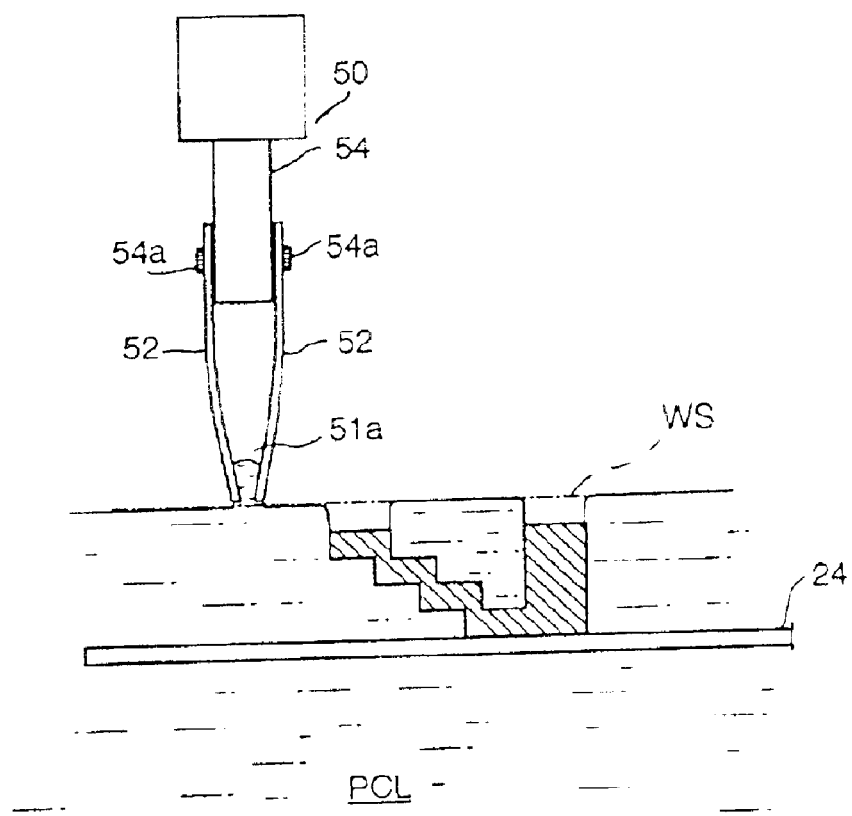
FIG. 3 is a side view of a liquid surface leveling device of the liquid surface layer leveling unit shown in FIGS. 2A and 2B.

FIG. 3 shows the liquid surface leveling device 50 in detail by way of example. The liquid surface leveling device 50 includes a pair of the leveling blades 52 which are secured to the attachment 54 by the set screws 54a and separated at their distal edges by a separation of, for example, preferably approximately one (1) mm from each other so as to form therebetween a narrow 1 mm space 51a that provides the leveling blades 52 with a capillary action. When the liquid surface leveling device 50 is moved down until the leveling blades 52 at their lower distal edges are brought into contact with the surface of the photo-curable liquid PCL, the leveling blades 52, because of their spacing and construction, work as a capillary to draw up the photo-curable liquid PCL into the space 51a by the aid of surface tension of the photo-curable liquid PCL to establish a small reservoir of PCL liquid above the gap 51a, as shown in FIG. 3. Since when the product table 24 is stepped down below the photo-curable liquid by a distance equal to the specified thickness of one cross-sectional stratum of the three-dimensional solid product, the surface of the photo-curable liquid does not always flow and cover evenly over the three-dimensional laminated product that is being built up due to the surface tension, liquidity and viscosity of the photo-curable liquid. Consequently, when the liquid surface leveling device 50 moves in one of the directions X and Y with the leveling blades 52 at their lower distal edges remaining in contact with the liquid surface, the collected reserve of photo-curable liquid is drawn and flows out from the space 51a between the leveling blades 52 to flow and cover over the three-dimensional laminated product LP, thereby immediately forming a surface layer of the photo-cured liquid having the specified thickness ready for photo-curing. While the liquid surface leveling device 50 moves, the leveling blades 52 at their lower distal edges smooths and levels the surface of the photo-curable liquid to form a uniform thickness of a surface layer over the three-dimensional laminated product, so as to enable immediate cure of the surface layer and conversion to a solid lamina having the specified thickness.

The three-dimensional solid product building unit 200A and photo-curing unit 200B are numerically controlled in operation in accordance with three-dimensional data of a design of a three-dimensional solid product provided by the aid of a computer system 300. Such systems are well known to those skilled in the art.

The following description will be directed to the process of producing a three-dimensional solid product which is formed by the method and apparatus of the invention and used as a model for producing a mold for casting rings by way of example.

Figure 4A:
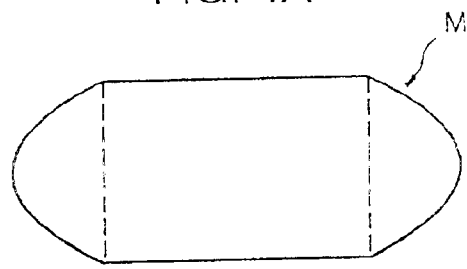
FIGS. 4A, 4B and 4C are front, top and cross-sectional views of a ring model designed by CAD, respectively.
Figure 4B:
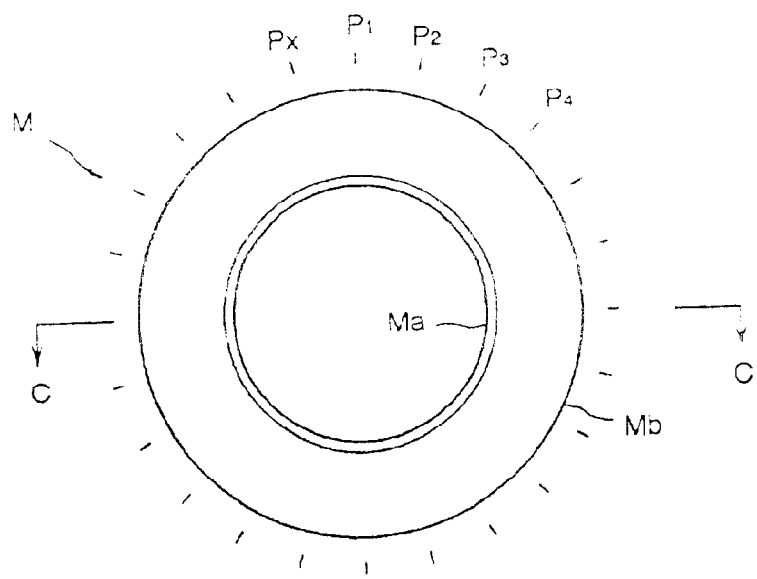
Figure 4C:
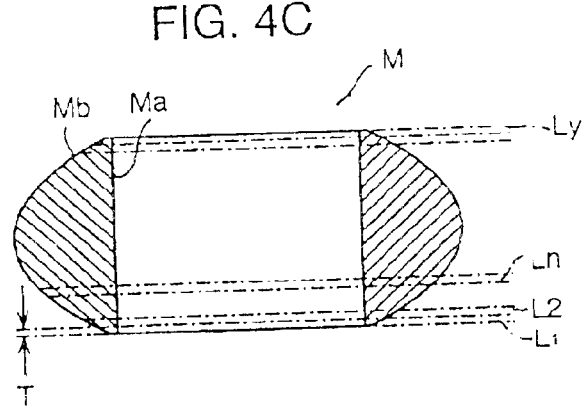

Referring to FIGS. 4A-4C which are side, plane and cross-sectional views of a model M that is three-dimensionally designed by the computer system 300 by the use of a known modeling program, CAD data is translated into CAM data which is three-dimensional numerical data of specified angular positions of points (P1, P2, . . . . Px) of inner and outer contours Ma and Mb for a number of cross-sectional strata of the model M.

Figure 5A:
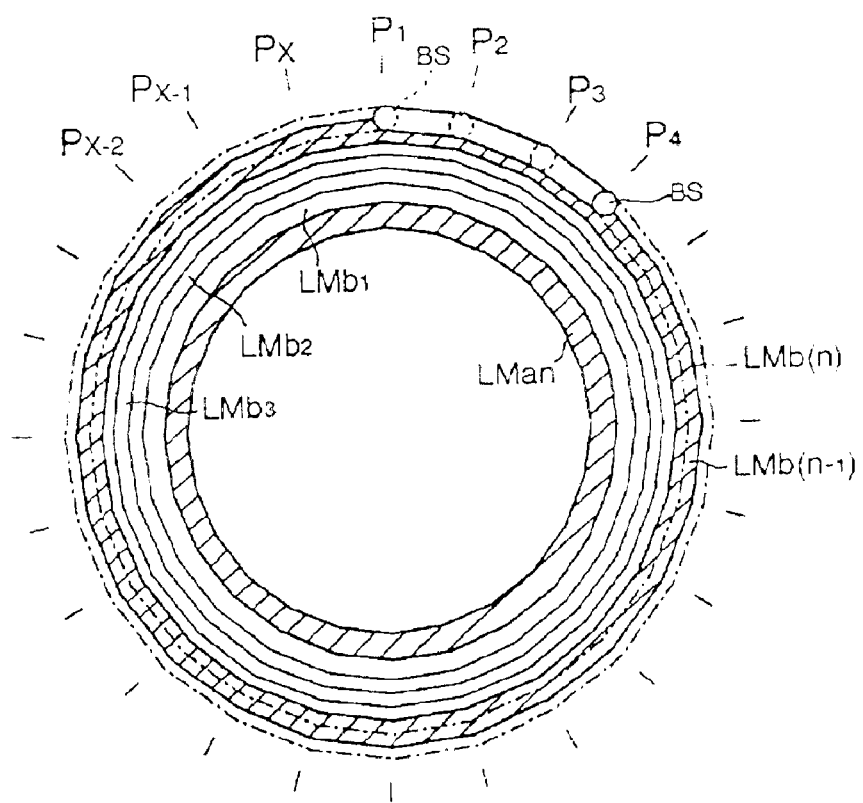
FIGS. 5A and 5B are explanatory top and cross-sectional views of part of a three-dimensional laminated product that is being built up by photo-curing.
Figure 5B:
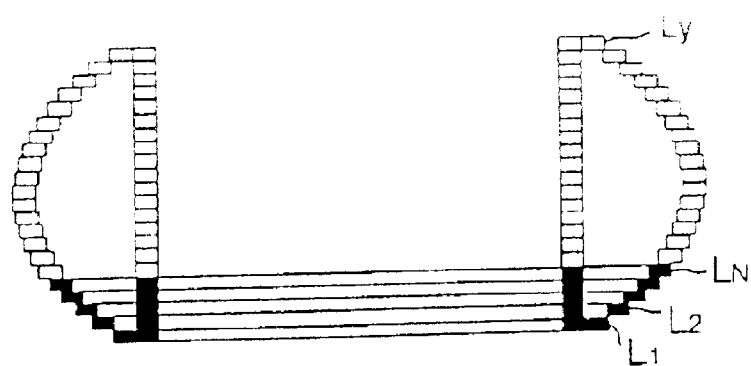

As shown in FIGS. 5A and 5B, when the three-dimensional solid product producing process is started according to the CAM data, the movable table 24 is moved down until it sinks into the photo-curable liquid PCL away from the working surface WS by a distance which is equal to the specified thickness of cross-sectional strata of the model T, and then the movable container table 22 is moved up or down according to a signal provided by the surface level sensor 30 so as to position the working surface WS of the photo-curable liquid PCL at the specified level with respect to the beam irradiation head 32 and subsequently, the liquid surface leveling unit 28 is moved over the working surface WS of the photo-curable liquid PCL to form a surface layer and smooth over the surface layer. Subsequently, the X-Y digital plotter 34 is controlled by the computer 300 to move the beam irradiation head 32 according to the CAM data. Immediately when the X-Y digital plotter 34 moves to locate the beam spot BS in a position P(1)1 on the working surface WS, the shutter is opened. Thereafter, the X-Y plotter 34 moves linearly to pass through positions P(1)2 . . . P(1)X at a constant speed between approximately 300 mm/min and 1,000 mm/min, desirably at a constant speed of 800 mm/min, to scan the surface of the photo-curable liquid PCL along a polygonal track. As a result, the area of the surface layer of the photo-curable liquid PCL that is traversed by the beam is progressively cured in the form of a polygon, which is almost similar to a circle, having a width equal to the diameter of the beam spot BS and converted to a polygon-shaped solid loop having the same thickness as the specified thickness of the cross-sectional stratum Ln of the model M. The polygonal solid loop LMa-1 forms an inner contour Ma of the first for the first cross-sectional strata L1 of the model M. As soon as the bean spot BS reaches the starting position P(1)1 passing through a position P-(1)X, the shutter is closed. Subsequently, the X-Y digital plotter 34 is moved outwardly to shift the beam irradiation head 32 by a distance equal to the diameter of the beam spot BS on the working surface WS, and the shutter is opened. Thereafter, the X-Y plotter 34 moves linearly to pass through positions P(1)2 . . . P(1)X at the constant speed to scan the working surface WS of the photo-curable liquid PCL, so as thereby to progressively cure the surface layer of the photo-curable liquid PCL in the form of a polygon having the same width as the diameter of the beam spot BS and convert it to a polygon-shaped solid loop having the same thickness as the specified thickness of the cross- sectional stratum L of the model M. The polygonal solid loop LMb1 forms an outer contour Mb of the first for the first cross-sectional strata L1 of the model M. These polygonal solid loops Lma1 and LMb1 constitute a first solid lamina equivalent to the first cross-sectional strata L1 of the model M.

When the beam spot BS reaches the starting position P(1)1, and the shutter is closed, the movable table 24 is moved down until the top surface of the polygonal solid loops LMa1 and LMb1 as a solid lamina sinks into the photo-curable liquid PCL away from the working surface WS by the same distance as the specified thickness T of cross-sectional strata of the model M. At this time, the movable container table 22 may be moved up or down according to a signal provided by the surface level sensor 30 so as to position the working surface WS of the photo-curable liquid PCL at the specified level with respect to the beam irradiation head 32, if some adjustment is necessary. Subsequently, the liquid surface leveling unit 28 is moved back over the working surface WS of the photo-curable liquid PCL to form a surface layer over the polygonal solid loops LMa1 and LMb1 and smooth over the surface layer.

In the same manner as described above, the X-Y digital plotter 34 is moved to locate the beam spot BS in a position P(2)1 over the working surface WS of the photo-curable liquid PCL and smooth over the surface layer and scan the surface of the photo-curable liquid PCL along a polygonal track, so as thereby to form polygonal solid loops Lma2 and is superposed LMb2 as second solid lamina equivalent to the second cross-sectional strata L2 of the model M over the previously formed first solid lamina. The same process is progressively performed according to the CAM data to form polygonal solid loops LMan and LMbn as solid laminae equivalent to cross-sectional stratum Ln of the model M.

By repeating the process the same times as the number of cross-sectional stratum of the model M to superpose the same number of polygonal solid loops as the number of cross-sectional stratum of the model M one top of the another, a three-dimensional laminated product is built up as a mold for rings on the table 24. The entire surface space between the inner and outer loops is solidified every 6 to 10 laminae to give structure to the product.

When the product has been completely built-up, it is removed from the table 24, and washed with ultrasonic cleaning for about 5 minutes to remove liquid resin. Use of ethanol and a detergent may also be required to remove the liquid resin. Next, the product or model is subjected to secondary hardening under ultraviolet ray treatment, to solidify the entire model.

Figure 6A:
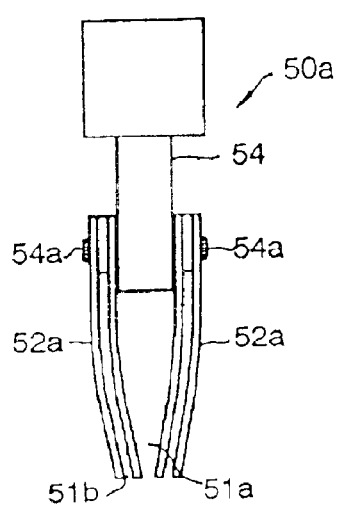
FIGS. 6A-6C are side schematic views showing various variants of the liquid surface leveling device shown in FIG. 3.
Figure 6C:
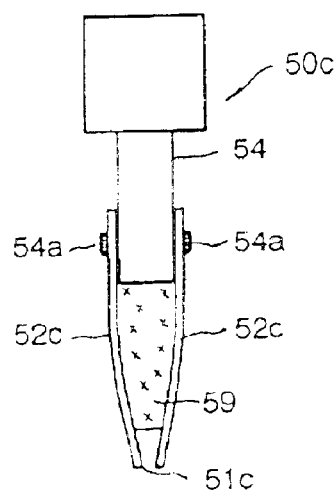
Figure 6B:
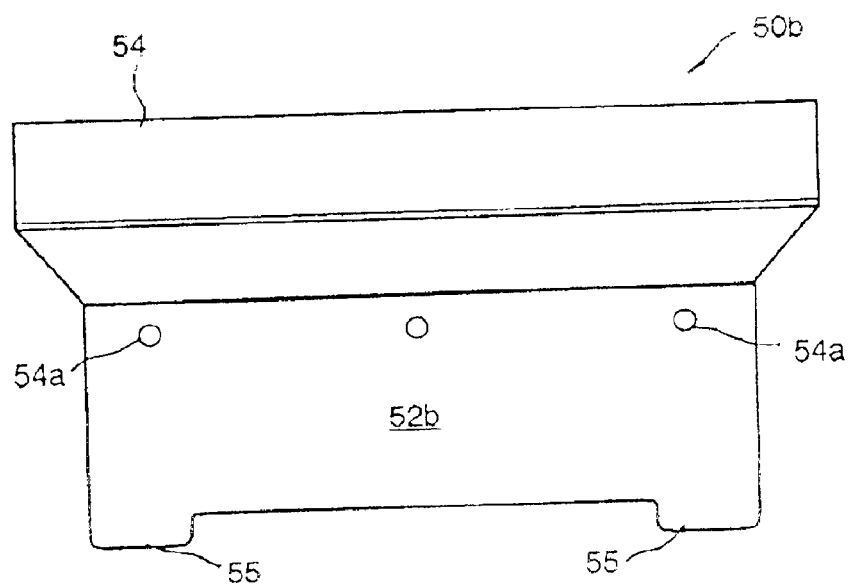

Various variants of the liquid surface leveling device 50 may be employed as schematically shown in FIGS. 6A through 6C. Liquid surface leveling device 50a shown in FIG. 6A comprises a pair of double walled leveling blades 52a detachably secured to an attachment 54. Each double-walled leveling blade 52a consists of outer and inner wall sections separated at a constant distance to provide a crevice or gap 51b which works as a supplementary capillary. Further, the double-walled leveling blades 52a are secured to the attachment 54 by set screws 54a and separated at distal edges by a separation of, for example, preferably approximately 1 mm from each other to form therebetween a narrow space 51a which works as a primary capillary. When the double walled leveling blades 52a are brought into contact with the surface of photo-curable liquid PCL, the liquid surface leveling device 50a draws up the photo-curable liquid PCL into the space 51a and the crevice 51b by the aid of its own capillary action and surface tension of the photo-curable liquid PCL. This liquid surface leveling device 50a is preferable to draw up and hold a larger quantity of the photo-curable liquid PCL therein.

FIG. 6B shows another liquid surface leveling device 50b which comprises a pair of surface leveling blades 52b are secured to an attachment 54 by set screws 54a and separated at lower distal edges by a separation of, for example, preferably approximately 1 mm from each other to form therebetween a narrow space 51b which works as a primary capillary. Each surface leveling blade 52b is formed with opposite end extensions 55 which is always positioned below the surface of the photo-curable liquid PCL to draw up the photo-curable liquid PCL into the space 51b while the surface leveling blades 52b are at least in contact with the surface of photo-curable liquid PCL. This liquid surface leveling device 50b is preferable to draw up the photo-curable liquid PCL and fill the space 51b with it quickly.

FIG. 6C shows still another liquid surface leveling device 50c which comprises a pair of surface leveling blades 52c separated at their distal edges by a specified separation of about 1 mm to form therebetween a narrow space 51c, and a porous pad 59, such as, a sponge pad or a foam pad, is interposed between the surface leveling blades 52c with an effect of actively holding or retaining the photo-curable liquid drawn up by capillary action, and supplying it over a laminated product that is being built up in the manner described. Further, the surface level blades 51*c* may themselves be made of porous material.

The liquid surface leveling device may take any form of combinations of the leveling blades 50, 50*a*–50*c* shown in FIGS. 3 and 6A through 6*c*.

While the present invention has been described in terms of a preferred embodiment, those skilled in the art recognize that the present invention can be practiced with various changes and modifications without departing from the scope of the claims.

What is claimed is:

1. A three-dimensional laminated product forming apparatus for forming a three-dimensional laminated product from a photo-curable liquid by progressively superposing solid laminae, one on top of another, with each lamina of the solid laminae having a specified thickness, and being provided by photo-curing a surface layer of the photo-curable liquid, said three-dimensional laminated product forming apparatus comprising:

a container for holding a photo-curable liquid therein;

a product table on which a three-dimensional laminated product is built up in progressive steps, said product table being mounted in the container to lie sunken beneath a working surface of the photo-curable liquid in the container, and adapted to be incrementally advanced into the photo-curable liquid step-by-step, each step being equal to the specified thickness of each lamina;

a liquid surface leveling device defining an elongated narrow capillary working gap at a bottom of the device in communication with a reservoir within the device for holding photo-curable liquid, said liquid surface leveling device being vertically movable to and from the working surface of the photo-curable liquid contained in the container, and when contacting the working surface, photo-curable liquid is drawn into the reservoir of the device by capillary action;

a driving mechanism for causing said liquid surface leveling device while in contact with the working surface of the photo-curable liquid to run over the working surface of the photo-curable liquid in said container to supply said photo-curable liquid from said reservoir via the capillary working gap to form a smoothed and leveled surface layer of photo-curable liquid over a three-dimensional laminated product that is being built up on the product table; and an irradiating head for irradiating said smoothed and leveled surface layer of photo-curable liquid with a beam spot of reactive stimulation to cure and convert the smoothed and leveled surface layer of photo-curable liquid into a lamina a the three-dimensional laminated product being built up on said product table.

2. A three-dimensional laminated product forming apparatus as defined in claim 1, wherein said liquid surface leveling device comprises a pair of blades disposed face to face.

3. A three-dimensional laminated product forming apparatus as defined in claim 2, wherein said liquid surface leveling device is made of a porous material.

4. A three-dimensional laminated product forming apparatus as defined in claim 2, wherein said liquid surface leveling device defines a plurality of elongated working gaps.

5. A three-dimensional laminated product forming apparatus as defined in claim 1, wherein each said blade is formed with a number of holes.

6. A three-dimensional laminated product forming apparatus as defined in claim 2, wherein said liquid surface leveling device further comprises a porous member interposed between said blades above the capillary working gap to absorb photo-curable liquid.

7. A three-dimensional laminated product forming apparatus as defined in claim 2, wherein the capillary working gap is defined by middle portions of the blades and end portions of the blades extend below the middle portions of the blades.

8. A method of forming a three-dimensional laminated product from a photo-curable liquid by progressively superposing solid laminae, one on top of another, each lamina having a specified thickness, and being provided by photo-curing a surface layer of the photo-curable liquid, said method comprising the steps of:

filling a container with a photo-curable liquid to define a working surface of said photo-curable liquid in said container, advancing a product table on which a three-dimensional laminated product is built up in progressive steps, below said working surface of said photo-curable liquid, incrementally step-by-step with each step being a depth equal to said specified thickness of each said lamina;

moving vertically downward a liquid surface leveling device defining a reservoir communicating with an elongated narrow capillary working gap formed therein, until said capillary working gap contacts with said working surface of said photo-curable liquid, whereby said photo-curable liquid is drawn by capillary action through the capillary working gap into the reservoir;

running horizontally the liquid surface leveling device over the working surface of said photo-curable liquid in said container to release photo-curable liquid from the reservoir via the capillary working gap to coat and smooth said working surface and thereby to form a smoothed and leveled surface layer of said photo-curable liquid over a three-dimensional laminated product that is being built up on said product table; and irradiating the smoothed and leveled surface layer of photo-curable liquid with a beam spot of reactive stimulation at said working surface to cure and convert the smoothed and leveled surface layer into a lamina on said three-dimensional laminated product being built up on said product table.

9. A method as defined in claim 8, including the further steps of sinking the capillary working gap of the liquid surface leveling device below the working surface of said photo-curable liquid, and returning upward the liquid surface leveling device so that the capillary working gap contacts the working surface, before running the liquid surface leveling device over said working surface of said photo-curable liquid.

10. A method as defined in claim 8, wherein the irradiating step is effected by a He-Cd laser having a wavelength of about 325 nm.

11. A method as defined in claims 8, including the further steps of removing the three-dimensional laminated product from the photo-curable liquid in the container, washing the removed product; and hardening the washed product with ultraviolet radiation.

* * * * *

UNITED STATES PATENT AND TRADEMARK OFFICE
CERTIFICATE OF CORRECTION

PATENT NO.    : 6,821,473 B2
DATED         : November 23, 2004
INVENTOR(S)   : Koki Hiizumi and Shigeru HagiHara It is certified that error appears in the above-identified patent and that said Letters Patent is hereby corrected as shown below:

Title page,
Item [73], Assignee, should read as follows:
-- [73] Assignee:    Meiko Co., Ltd.
                     Kitakoma-gun, Yamanashi, Japan

Yamanashi Prefecture
                     Kofu-shi, Yamanashi, Japan --

Signed and Sealed this

Seventeenth Day of May, 2005

JON W. DUDAS
*Director of the United States Patent and Trademark Office*